(12) United States Patent
Wu et al.

(10) Patent No.: US 12,081,985 B2
(45) Date of Patent: Sep. 3, 2024

(54) BROADCAST OF INTRUSION DETECTION INFORMATION

(71) Applicant: Hewlett Packard Enterprise Development LP, Houston, TX (US)

(72) Inventors: Junpeng Wu, Beijing (CN); Tong Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 134 days.

(21) Appl. No.: 17/512,161

(22) Filed: Oct. 27, 2021

(65) Prior Publication Data

US 2023/0129553 A1    Apr. 27, 2023

(51) Int. Cl.
*H04W 12/122*    (2021.01)
*H04W 12/03*    (2021.01)
*H04W 12/06*    (2021.01)

(52) U.S. Cl.
CPC ......... *H04W 12/122* (2021.01); *H04W 12/03* (2021.01); *H04W 12/06* (2013.01)

(58) Field of Classification Search
CPC .... H04W 21/122; H04W 12/03; H04W 12/06
USPC .......................................................... 726/26
See application file for complete search history.

(56) References Cited

U.S. PATENT DOCUMENTS

| | | | |
|---|---|---|---|
| 7,002,943 B2 | 2/2006 | Bhagwat et al. | |
| 7,380,268 B2 * | 5/2008 | Challener | H04L 63/1408 726/22 |
| 7,882,349 B2 | 2/2011 | Cam-Winget et al. | |
| 8,693,361 B2 | 4/2014 | Bejerano et al. | |
| 8,743,727 B2 * | 6/2014 | Selvam | G01S 5/14 370/252 |
| 9,007,978 B2 | 4/2015 | Bejerano et al. | |
| 9,298,958 B1 | 3/2016 | Amir | |
| 9,763,202 B2 * | 9/2017 | Ikenaga | H04B 17/318 |
| 9,888,387 B2 * | 2/2018 | Chen | H04W 60/005 |
| 10,009,838 B2 * | 6/2018 | Park | H04W 48/20 |
| 10,869,195 B2 * | 12/2020 | Bishop | H04W 12/06 |
| 10,880,749 B2 * | 12/2020 | Han | H04L 63/10 |
| 11,019,496 B2 * | 5/2021 | Tian | G06F 21/6245 |
| 11,243,983 B2 * | 2/2022 | De | H04W 12/122 |
| 11,265,700 B2 * | 3/2022 | Huber | H04W 68/02 |
| 2006/0165073 A1 | 7/2006 | Gopinath et al. | |
| 2008/0170497 A1 | 7/2008 | Jeong et al. | |
| 2008/0250500 A1 | 10/2008 | Olson et al. | |
| 2014/0105094 A1 | 4/2014 | Soundararajan | |

(Continued)

FOREIGN PATENT DOCUMENTS

EP       3629636 B1 *  4/2021  .......... H04B 17/318
WO    WO-2007061167 A1    5/2007

(Continued)

*Primary Examiner* — Venkat Perungavoor
*Assistant Examiner* — Peiliang Pan
(74) *Attorney, Agent, or Firm* — Hewlett Packard Enterprise Patent Department

(57) ABSTRACT

Implementations of the present disclosure relate to intrusion detection information. A method comprises detecting, by an access point (AP), at least one device in a wireless communication network to be an illegal device. The method also comprises obtaining, by the AP, intrusion detection information related to the at least one device, the intrusion detection information comprising at least one identifier of the at least one device.

20 Claims, 8 Drawing Sheets

(56) References Cited

U.S. PATENT DOCUMENTS

| | | | |
|---|---|---|---|
| 2014/0325615 A1* | 10/2014 | Scahill | H04L 63/1416 |
| | | | 726/4 |
| 2015/0139211 A1* | 5/2015 | Ji | H04W 12/122 |
| | | | 370/338 |
| 2020/0045062 A1* | 2/2020 | Cambridge | G08B 7/06 |
| 2021/0067972 A1* | 3/2021 | Mcgrath | H04W 4/90 |
| 2021/0345112 A1* | 11/2021 | Elliott | H04W 12/12 |
| 2022/0030027 A1* | 1/2022 | Venkataramaiah | |
| | | | H04L 63/1425 |
| 2022/0353685 A1* | 11/2022 | Elliott | H04W 12/08 |
| 2023/0034609 A1* | 2/2023 | Huang | H04W 24/08 |
| 2023/0370920 A1* | 11/2023 | Zhou | H04W 4/08 |

FOREIGN PATENT DOCUMENTS

| | | | | |
|---|---|---|---|---|
| WO | WO-2013173163 A1 * | 11/2013 | | G01S 13/876 |
| WO | WO-2022042265 A1 * | 3/2022 | | H04W 36/03 |

* cited by examiner

BROADCAST OF INTRUSION DETECTION INFORMATION

BACKGROUND

Intrusion detection techniques are used to monitor a network for malicious activity or policy violations, and to detect illegal devices in the network. If a device in the network is detected by an access point (AP) to be an illegal device, the AP may perform containment to the illegal device to protect the clients from connecting to the illegal device.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

If a device is detected to be an illegal device, information related to the detected illegal device is typically reported or collected centrally using a security information and event management system. However, such information is sent to an AP responsive to a request. If an AP detects an illegal device, other APs in the network would not know about the illegal device unless they send a request to the AP or detect the illegal device by themselves.

In addition, as mentioned above, the AP may perform containment to the illegal device. However, the device may be incorrectly detected as illegal for certain reasons, and thus the communication between the device and its clients is interrupted by mistake. For example, if an AP disconnects from a master or central AP among enterprise-level APs, i.e. it is out of control of the master or central AP, then it may consider other APs among the enterprise-level APs as illegal devices. The other APs may be attacked by the AP which loses control, and the clients of the other APs are unable to connect to the network. From the perspective of the other APs which are incorrectly detected as illegal, it is difficult for them to find out which AP performs the containment, and thus those AP may need to spend more time on trying to reconnect with the clients.

Figure 1:
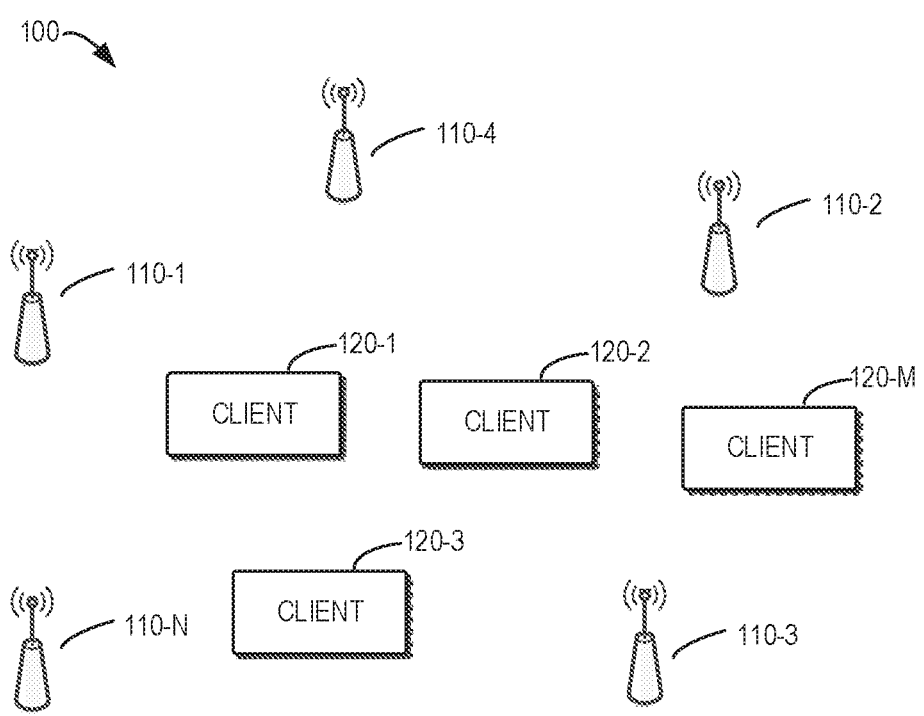
FIG. 1 illustrates an example communication environment in which example implementations of the present disclosure can be implemented.

FIG. 1 illustrates an example environment 100 in which example implementations of the present disclosure can be implemented. The example environment 100 may be implemented as a wireless communication network such as a Wireless Local Area Network (WLAN). As used herein, "wireless communication network" and "network" may be exchangeable.

The example environment 100 includes client 120-1, client 120-2, client 120-3, . . . , and client 120-M, where M is an integer larger than or equal to one, For the purpose of discussion, the client 120-1, client 120-2, client 120-3, . . . , and client 120-M may be collectively referred to as "clients 120" or individually referred to as a "client 120".

A client 120 may also be referred to as a user device or station (STA). Examples of the client 120 may include, but are not limited to, a cell phone, tablet device, laptop computer or the like.

The example environment 100 further includes AP 110-1, AP 110-2, AP 110-3, AP 110-4, . . . , and AP 110-N, where N is an integer larger than one. For the purpose of discussion, the AP 110-1, AP 110-2, AP 110-3, AP 110-4, . . . , and AP 110-N may be collectively referred to as "APs 110" or individually referred to as a "AP 110".

An AP 110 may be any suitable device that allows one or more clients 120 to connect to the wireless communication network in the example environment 100. The AP 110 may be a physical AP, or the AP 110 may be implemented as a Virtual Access Point (VAR) functioning as a physical "AP".

As used herein, an AP may also comprise, be implemented as, or known as a Radio Router, Radio Transceiver, switch, Wi-Fi hotspot device, Basic Service Set (BSS), Extended Service Set (ESS), Radio Base Station (RBS), or some other terminology.

It is to be understood that the specific numbers of APs and clients in FIG. 1 are only for the purpose of illustration without suggesting any limitations. The example environment 100 may include any suitable number of APs and clients configured for implementing implementations of the present disclosure.

Communications in the example environment 100 may operate according to the wireless communication protocols such as Institute of Electrical and Electronic Engineers (IEEE) 802.11 standards, Wi-Fi Alliance Specifications, or any other wireless communication standards.

According to example implementations described herein, an AP is capable of actively monitoring the network and detecting illegal devices using intrusion detection techniques. In the case that a device is detected to be illegal by the AP, the AP proactively broadcasts information related to the detected illegal device in the network. The example implementations will be described in detail below with reference to FIG. 2.

Figure 2:
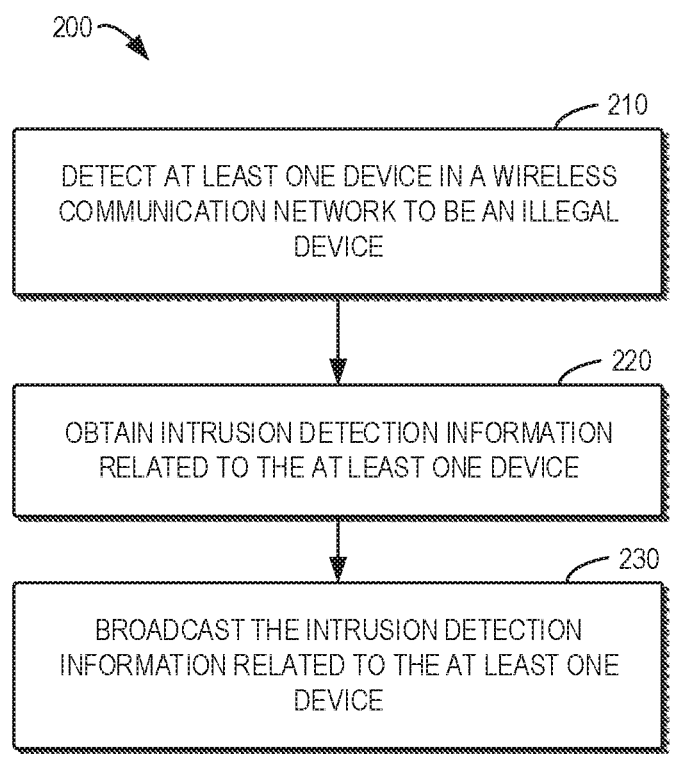
FIG. 2 illustrates a flowchart of a method in accordance with some example implementations of the present disclosure.

FIG. 2 illustrates a flowchart of a method 200 in accordance with some example implementations of the present disclosure. The method 200 can be implemented at an AR according to the implementations described herein. For the purpose of discussion, reference is made to FIG. 1 to describe the method 200. It is noted that although only some blocks are shown in the method 200, the method 200 may comprise other operations described herein.

At 210, the AP 110 detects at least one device in a wireless communication network to be an illegal device. The at least one device may include an AP(s) and/or any other type of devices in the network. At 220, the AP 110 obtains intrusion detection information related to the at least one device. The intrusion detection information comprises at least one identifier of the at least one device. At 230, the AP 110 broadcasts the intrusion detection information related to the at least one device.

For example, AP 110-2 and AP 110-3 as shown in FIG. 1 are detected to be illegal devices by AP 110-1. Upon the detecting of the illegal devices, the AP 110-1 may obtain intrusion detection information related to APs 110-2 and 110-3. The intrusion detection information may comprise an identifier of the AP 110-2 and an identifier of the AP 110-3. The intrusion detection information then may be broadcasted by the AP 110-1.

In some example implementations, an identifier of the at least one device may include an address of the at least one device, for example, a Basic Service Set Identifier (BSSID) of the at least one device. In some example implementations, the intrusion detection information may further comprise an identifier (e.g. BSSID) of the AP 110 that detects at least one device to be the illegal device. In this way, when other devices (e.g., APs) in the network receive the intrusion detection information, they may be able to know about the malicious activity or policy violations in the network, and determine which device(s) is detected to be illegal and/or which device performed the detection.

In some example implementations, the AP 110 may insert the intrusion detection information into a vendor information element of a beacon frame for the AP 110, and then broadcast the beacon frame. In some example implementations, the beacon frame is broadcasted periodically, e.g. every 100 milliseconds.

In some example implementations, the AP 110 may encrypt the intrusion detection information and broadcast the encrypted intrusion detection information. For devices that conform to the same secret agreement, they can decrypt the encrypted information communicating between each other. In this way, the intrusion detection information will not be leaked to devices that are unable to decrypt it.

In some example implementations, upon detecting at least one device to be an illegal device, the AP 110 may disconnect a connection between the at least one device and a client with which the at least one device is connected. For example, a client 120-2 is currently connected with the AP 110-2, and clients 120-1 and 120-3 are connected with the AP 110-3. When the AP 110-2 and AP 110-3 are detected to be illegal by the AP 110-1, the AP 110-1 may disconnect the connections between the APs 110-2, 110-3 and the clients 120-1, 120-2, 120-3, respectively. The AP 110-1 may disconnect the connections by performing containment on the APs 110-2 and 110-3. Performing containment as described herein may be referred to as an AP attacking an illegal device. This will be described in detail below with reference to FIG. 3.

Figure 3:
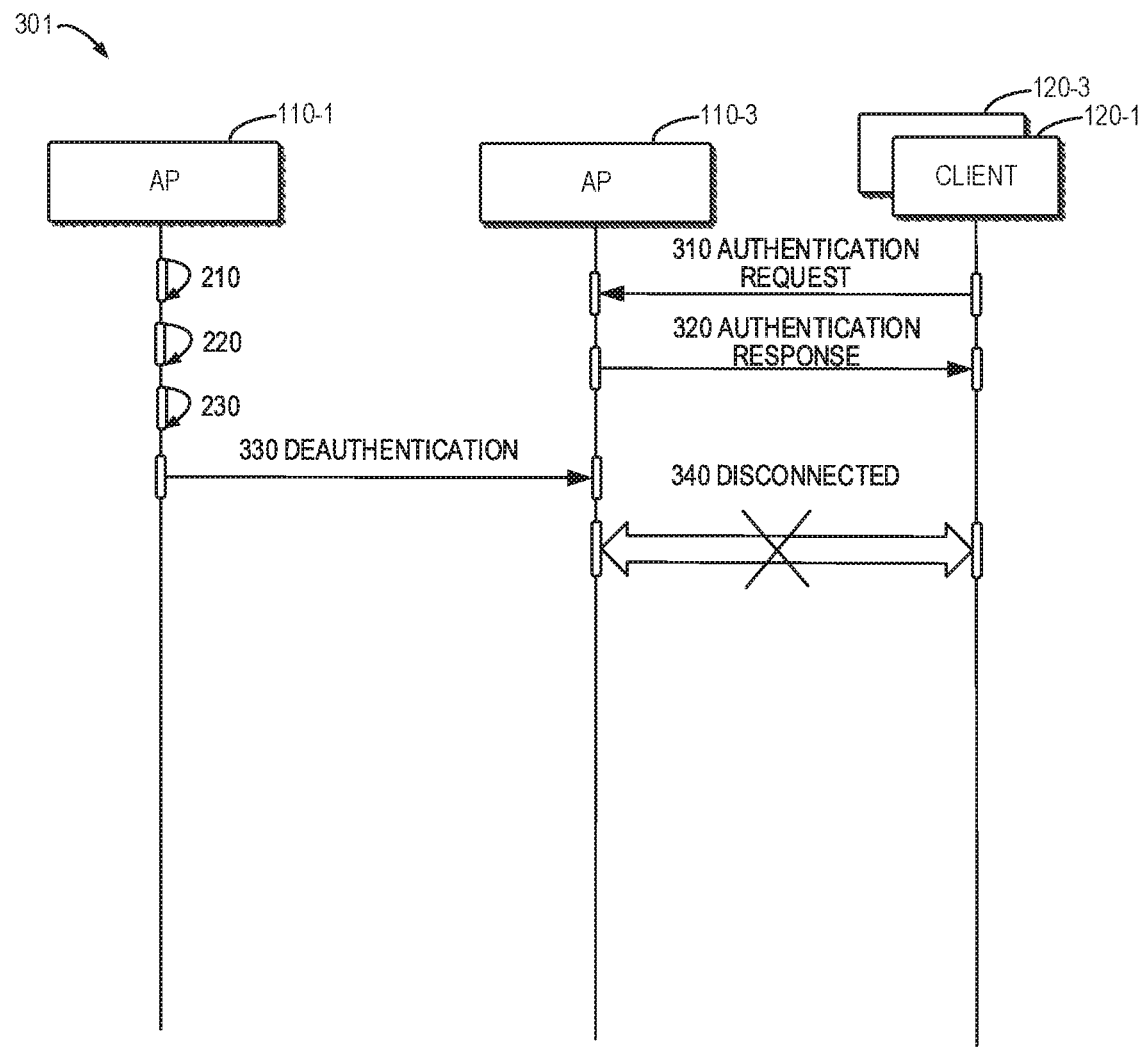
FIG. 3 illustrates an example signaling flow in accordance with some example implementations of the present disclosure.

FIG. 3 illustrates an example signaling flow 301 in accordance with some example implementations of the present disclosure. In this example, it is assumed that the AP 110-1 implements the actions at 210, 220, and 230 of the method 200 described with reference to FIG. 2, to detect the AP 110-3 to be an illegal device and broadcasts the intrusion detection information related to the AP 110-3. It is further assumed that the clients 120-1 and 120-3 are connected with the AP 110-3. As illustrated in FIG. 3, at 310, the clients 120-1 and 120-3 may respectively transmit an authentication request to the AP 110-3. Then at 320, in response to the request, the AP 110-3 may authenticate the clients 120-1 and 120-3 by transmitting an authentication response to the clients 120-1 and 120-3. As a result, the clients 120-1 and 120-3 may connect with AP 110-3.

In order to protect the clients 120-1 and 120-3 from the AP 110-3 that is detected to be illegal, the AP 110-1 may disconnect the connection between the AP 110-3 and the clients 120-1 and 120-3 by performing containment on the AP 110-3. For example, the AP 110-1 may initiate an attack, such as a deauthentication attack at 330, to the AP 110-3, so that the authentications between the AP 110-3 and the clients 120-1 and 120-3 become invalid. Sequentially, the connections between the AP 110-3 and the clients 120-1 and 120-3 are interrupted at 340.

In some example implementations, the intrusion detection information may further comprise containment information associated with the AP (AP 110-1 in the example of FIG. 3) that performs containment on devices detected to be illegal. The containment information indicates at least an identifier (e.g. BSSID) of the AP 110. In addition, the containment information may further indicate an identifier (e.g. BSSID) of the client that has been disconnected from the detected illegal device. In this way, when other devices in the network receive the broadcasted intrusion detection information, they may be able to determine which device is performing the containment on the illegal devices detected and which client has already been protected.

In addition, the containment information may further indicate an approach used by the AP (e.g. the AP 110-1) to disconnect the connection between the at least one device detected to be illegal (e.g. the AP 110-3) and the client (e.g, the clients 120-1 and 120-3). The approach may include the AP Flood Attack, Disconnect Station Attack, Man in the Middle Attack, AP Deauth Containment, Client Deauth Containment, and Tarpit Containment, etc., for example.

It would be appreciated that the AP 110-1 may perform similar actions on other APs or devices that are detected to be illegal. The example in FIG. 3 is provided for the purpose of illustration only without suggesting any limitation.

The broadcasted intrusion detection information may be received by any device or AP in the network. In some example implementations, as a response to the receipt of the intrusion detection information, some devices or APs in the network may further forward the intrusion detection information to other devices or perform containments in order to protect the clients. In some example implementations, upon receipt of the intrusion detection information, a device or AP may find that it is incorrectly detected as an illegal device. In such a case, the device or AP may need to announce that it is legal and its connection with the clients may be resumed.

The example implementations related to a device which receives the intrusion detection information will be described in detail below with reference to FIG. 4.

Figure 4:
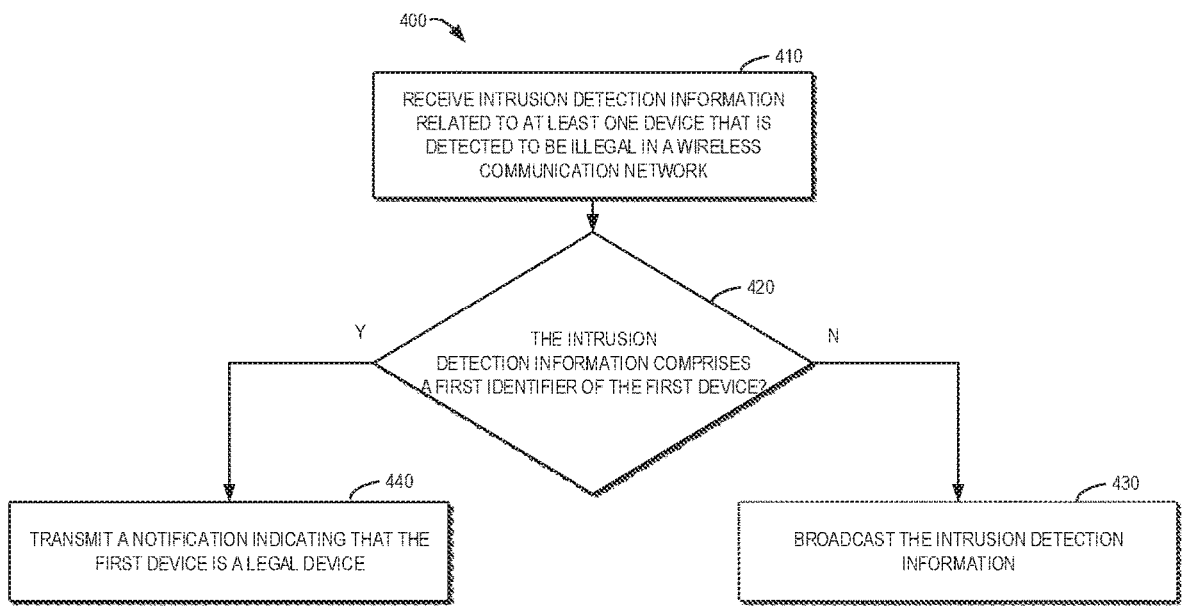
FIG. 4 illustrates a flowchart of a method in accordance with some example implementations of the present disclosure.

FIG. 4 illustrates a flowchart of a method 400 in accordance with some example implementations of the present disclosure. The method 400 can be implemented at a first device (e.g. an AP) in the network according to the implementations described herein. For the purpose of discussion, reference is made to FIG. 1 to describe the method 400. It is noted that although only some blocks are shown in the method 400, the method 400 may comprise other operations described herein. It is assumed that the first device is a legal device in the network.

At 410, a first device in the network receives intrusion detection information related to at least one device that is detected to be illegal in the wireless communication network. The intrusion detection information comprises at least one identifier of the at least one device. The intrusion detection information may be received directly from an AP 110 that detects the at least one device to be illegal (e.g., the AP 110-1 in the example or from an intermediate AP 110 that broadcasts the intrusion detection information received from another AP 110.

At 420, the first device determines whether the intrusion detection information comprises a first identifier of the first device. The first device may act differently depending on a result of the determination.

If it is determined that the intrusion detection information does not comprise the first identifier of the first device, the first device broadcasts the intrusion detection information at 430. If the first identifier of the first device is not comprised in the received intrusion detection information, it means that the first device is not detected by other devices or APs as an illegal device. In such a case, the first device may act as an intermediate device which facilitates the broadcasting of the intrusion detection information within the network. The example implementations of the intermediate device will be described in detail below with reference to FIG. 5A.

It is noted that the re-broadcasting of the received intrusion detection information may be an optional operation for the first device. In some example implementations, if the first device determines that its identifier is not comprised in the received intrusion detection information, it may not broadcast the intrusion detection information again.

Figure 5A:
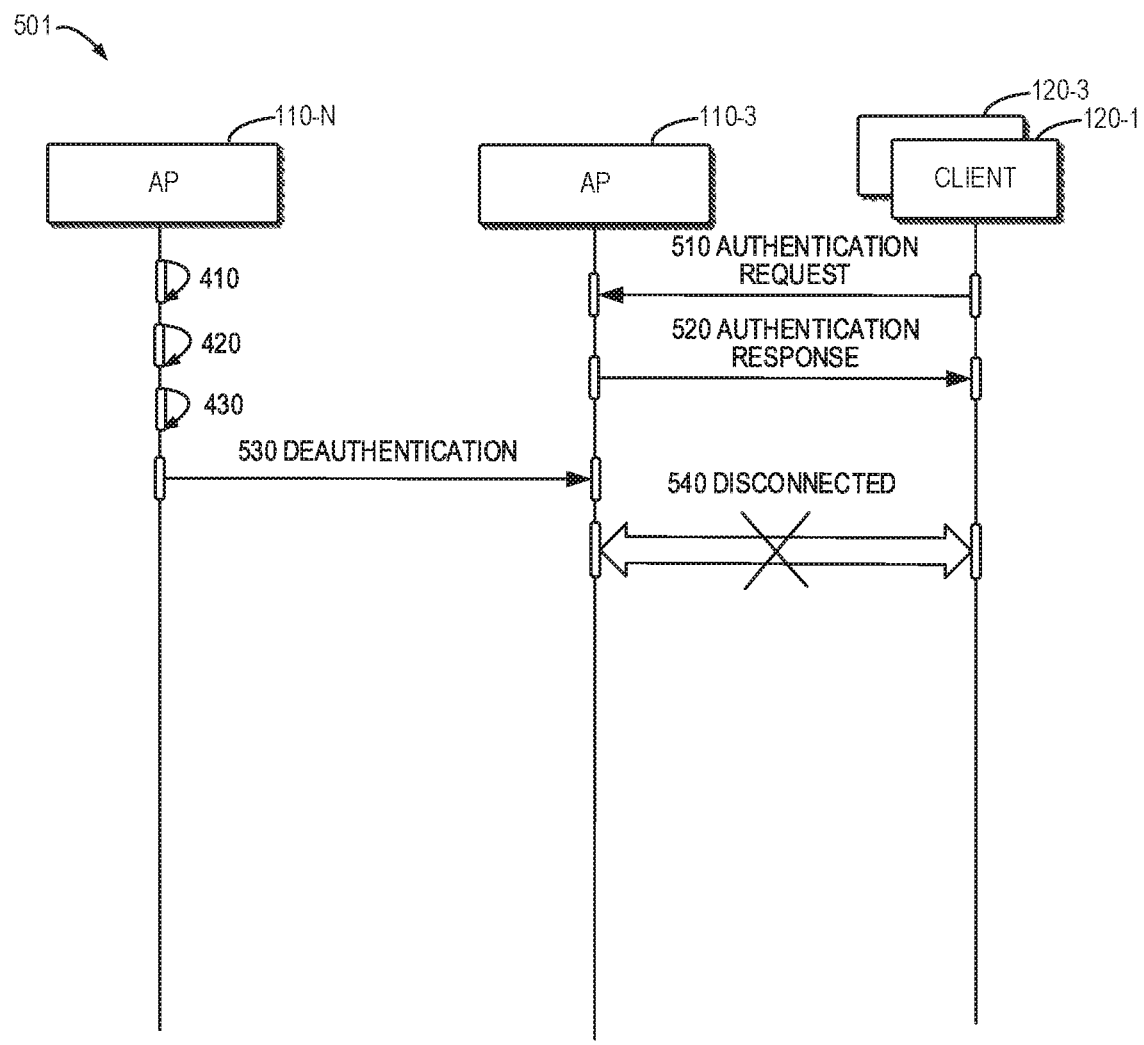
FIG. 5A illustrates an example signaling flow in accordance with some example implementations of the present disclosure.
Figure 5B:
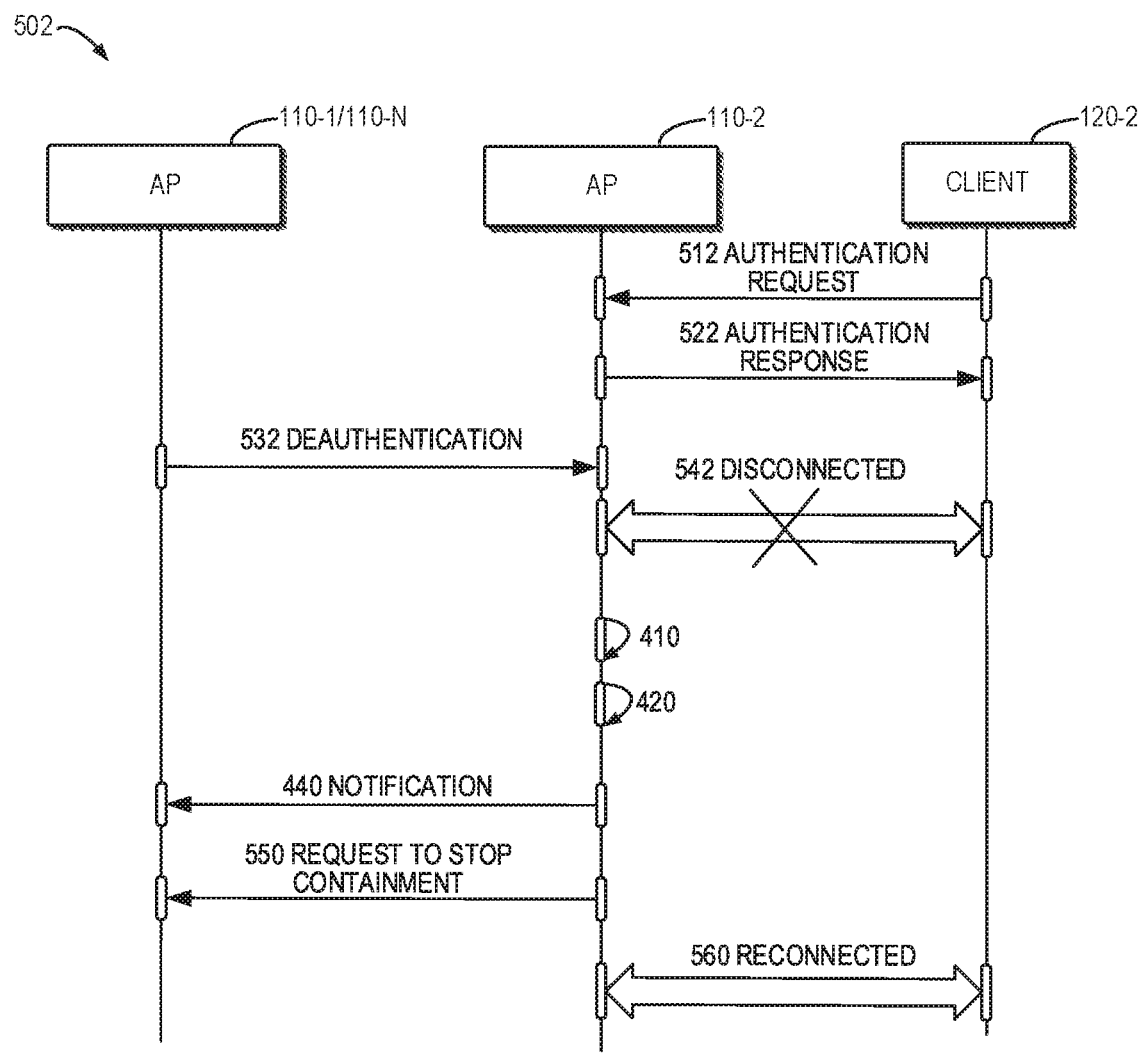
FIG. 5B illustrates another example signaling flow in accordance with some example implementations of the present disclosure.

If it is determined that the intrusion detection information comprises the first identifier of the first device but the first device is a legal device, the first device transmits a notification to the AP 110 at 440, to indicate that the first device is a legal device. In such a case, by detecting the identifier(s) included in the received intrusion detection information, the first device may determine whether it is incorrectly detected to be illegal for some reason. The example implementations related to a device being incorrectly detected as illegal will be described in detail below with reference to FIG. 5B FIG. 5A illustrates an example signaling flow 501 in accordance with some example implementations of the present disclosure, In this example, it is assumed that the AP 110-N implements the actions at 410, 420, and 430 of the method 400 described with reference to FIG. 4, to receive and broadcast the intrusion detection information related to the AP 110-3 that is detected to be illegal. As mentioned above, in this example, the AP 110-N acts as an intermediate AP.

In the example implementations of FIG. 5A, the AP 110-N may perform containment on the AP 110-3, in responsive to receiving the intrusion detection information related to the AP 110-3.

In this example, it is further assumed that the clients 120-1 and 120-3 are connected with the AP 110-3. The clients 120-1 and 120-3 may be authenticated respectively by the AP 110-3 through the actions at 510 and 520, which are similar to the actions at 310 and 320 as discussed with reference to FIG. 3. So that the clients 120-1 and 120-3 may connect with AP 110-3.

If the AP 110-N perform containment on the AP 110-3 to protect the clients 120-1 and 120-3 from the AP 110-3 that is detected to be illegal, it may implements the actions at 530 and 540 similarly to the actions at 330 and 340 as discussed with reference to FIG. 3. Description will not be repeated here for the purpose of simplicity In some example implementations, upon performing the containment on the AP 110-3, the AP 110-N may update the intrusion detection information by including containment information associated with the AP 110-N into the intrusion detection information. The containment information indicates at least the identifier of the AP 110-N. The updated intrusion detection information may then be broadcasted.

In some example implementations, the AP 110-N may encrypt the updated intrusion detection information and broadcast the encrypted and updated intrusion detection information.

In addition, the containment information may further indicate an approach used by the AP 110-N to disconnect the connections between the AP 110-3 and the clients 120-1 and 120-3. The approach may include the AP Flood Attack, Disconnect Station Attack, Man in the Middle Attack, AP Deauth Containment, Client Deauth Containment, and Tarpit Containment, etc., for example.

As an example implementation, the AP 110-N may insert the intrusion detection information into a vendor information element of a beacon frame for the AP 110-N, and then broadcast the beacon frame. In some example implementations, the beacon frame is broadcasted periodically, e.g. every 100 milliseconds.

It would be appreciated that the AP 110-N may perform similar actions on other APs or devices that are detected to be illegal. The example in FIG. 5A is provided for the purpose of illustration only without suggesting any limitation.

FIG. 5B illustrates another example signaling flow 502 in accordance with some example implementations of the present disclosure. In this example, it is assumed that the AP 110-2 implements the actions at 410, 420, and 440 of the method 400 described with reference to FIG. 4, to receive from an AP 110 the intrusion detection information comprising an identifier of the AP 110-2 that is detected to be illegal. It is further assumed that the client 120-2 is connected with the AP 110-2. Similarly to the discussion with reference to FIG. 3, the client 120-2 may be authenticated by the AP 110-2 through the actions at 512 and 522. So that the client 120-2 may connect with AP 110-2.

The AP 110-2 receives the intrusion detection information from a device, e.g. the AP 110-1 that detects the AP 110-2 to be illegal as discussed with reference to FIG. 3, or the AP 110-N acting as an intermediate AP as discussed with reference to FIG. 5A. In either case, the AP 110-2 may be performed with containment through actions at 532 and 542. The containment may be performed by the AP 110-1 or 110-N from which the AP 110-2 receives the intrusion detection information.

Since the AP 110-2 is a legal device and is incorrectly detected to be illegal for some reason, the containment will interrupt a normal connection between the AP 110-2 and the client 120-2. For example, in an enterprise-level environment, APs 110-1 and 110-2 belong to a group of enterprise-level APs. There is a master AP (not shown) in the group. When AP 110-1 disconnects form the master AP, it may detect all other APs, including the legal AP 110-2, as illegal devices.

Interrupting the connection of the legal device is not desireable. In some example implementations, the AP 110-2 may attempt to reassume the connection with its client. The AP 110-2 may determine which AP blocks the connection between the AP 110-2 and the client 120-2 and then request the AP to stop the blocking. Specifically, the AP 110-2 may detect the containment information comprised in the received intrusion detection information. The containment information may indicate an identifier of a device (e.g. the AP 110-1 or AP 110-N) that performs the containment on the AP 110-2. With the identifier (which may be a BSSID of the AP) determined, the AP 110-2 may transmit a request to the AP 110-1 or AP 110-N for allowing the connection between the AP110-2 and the client 120-2.

In this way, a device incorrectly detected to be illegal is able to efficiently find out which AP is performing the containment on the device and has an opportunity to reassume the connection.

It is to be understood that the intrusion detection information described above are only examples. Those skilled in the art can envisage intrusion detection information with any information related to the device that detected to be illegal.

Figure 6:
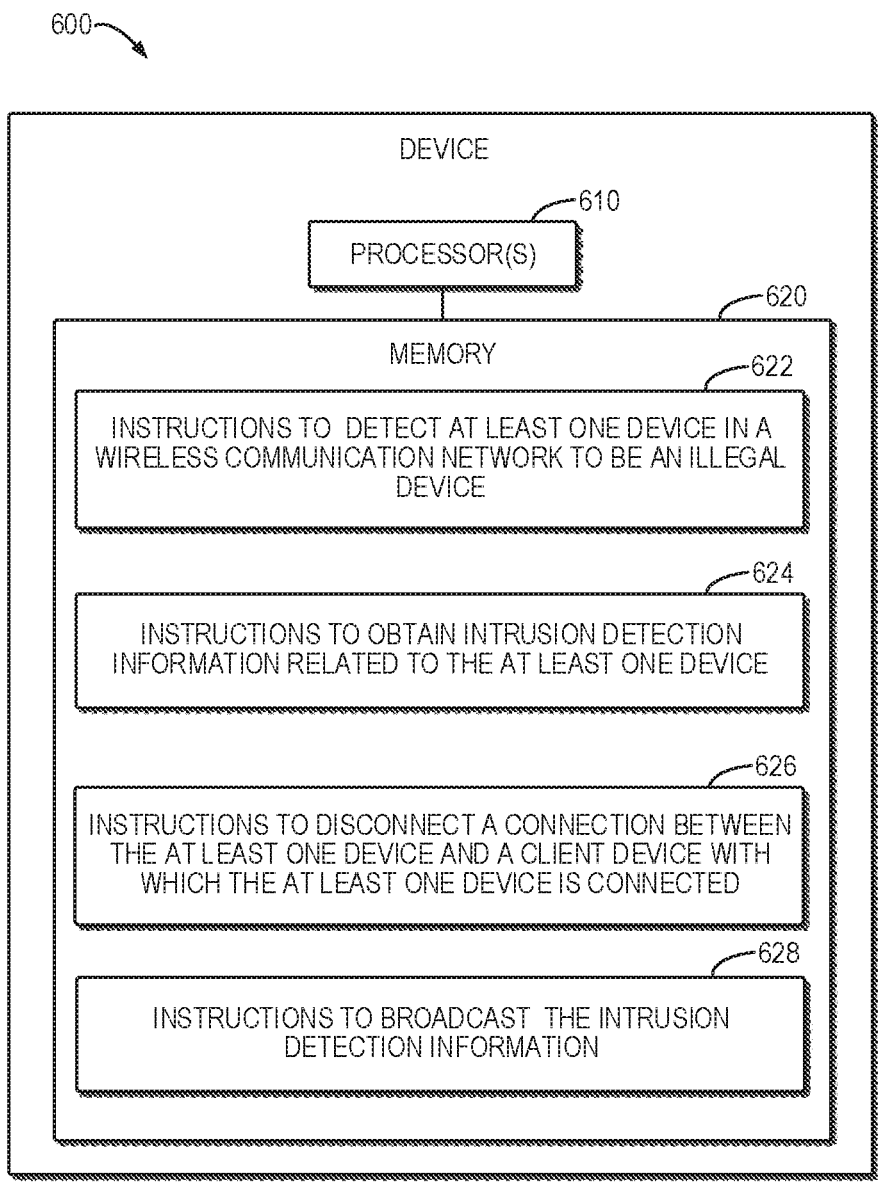
FIG. 6 illustrates a block diagram of a communication device in accordance with some example implementations of the present disclosure.

FIG. 6 illustrates a block diagram of an example device 600 in accordance with some example implementations of the present disclosure. The device 600 may be implemented as or included in the AP 110 in FIG. 1.

The device 600 comprises at least one processor 610 and a memory 620 coupled to the at least one processor 610. The memory 620 stores instructions to cause the at least one processor 610 to implement acts of a method according to some example implementations as described herein.

As illustrated in FIG. 6, the memory 620 stores instructions 622 to detect at least one device in a wireless communication network to be an illegal device.

The memory 620 further stores instructions 624 to obtain intrusion detection information related to the at least one device, the intrusion detection information comprising at least one identifier of the at least one device. In some example implementations, the identifier of the at least one device comprises an BSSID of the at least one device.

In some example implementations, the intrusion detection information further comprises containment information associated with the communication device, the containment information indicating at least an identifier of the communication device.

In some example implementations, the containment information further indicates an approach used by the communication device to disconnect the connection between the at least one device and the client.

The memory 620 further stores instructions 626 to disconnect a connection between the at least one device and a client with which the at least one device is connected.

The memory 620 further stores instructions 628 to broadcast the intrusion detection information.

In some example implementations, the instructions to broadcast the intrusion detection information comprise instructions to encrypt the intrusion detection information and to broadcast the encrypted intrusion detection information.

In some example implementations, the instructions to broadcast the intrusion detection information comprise instructions to insert the intrusion detection information in a vendor information element of a beacon frame for the communication device and to broadcast the beacon frame.

The memory 620 further stores instructions to receive a request from a first device of the at least one device to allow the connection between the first device and the client, the request comprising an identifier of the communication device; and instructions to allow the connection between the first device and the client in response to receipt of the request.

Figure 7:
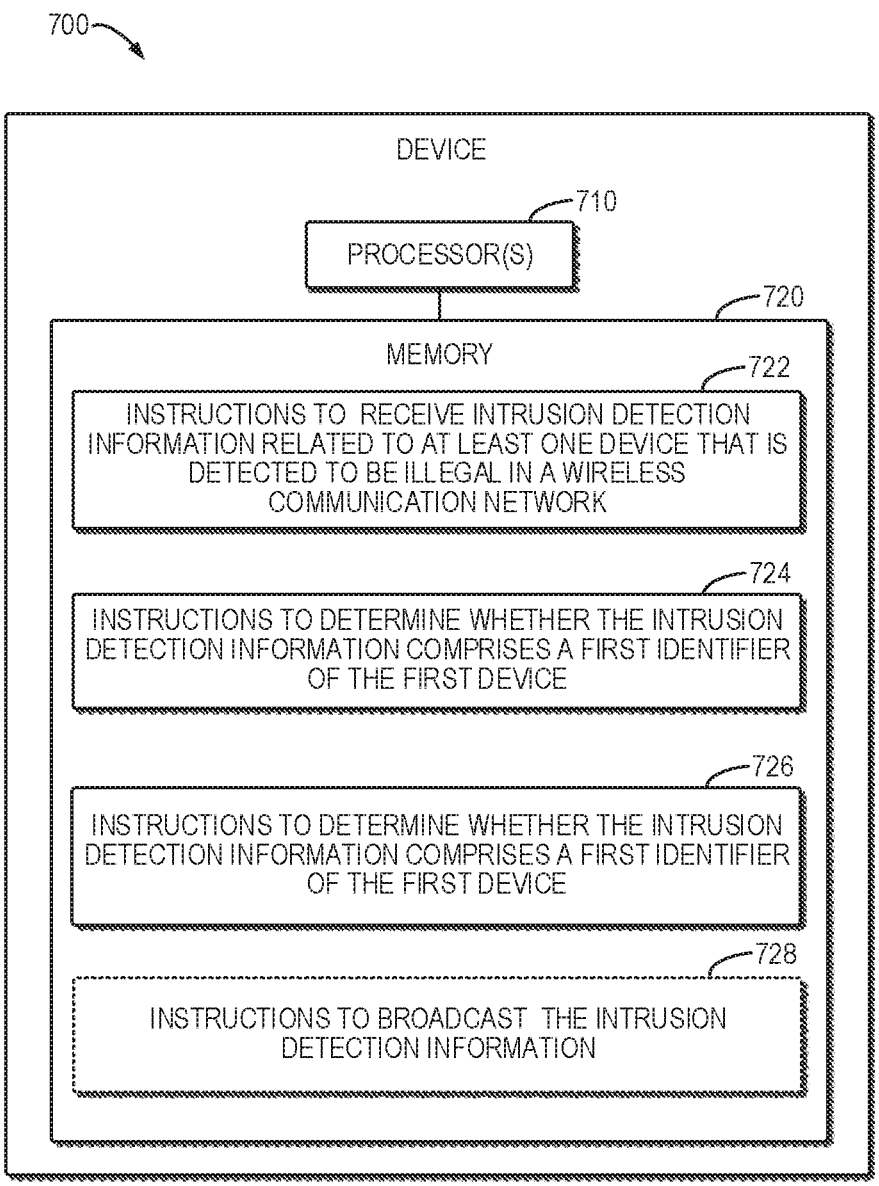
FIG. 7 illustrates a block diagram of a communication device in accordance with some example implementations of the present disclosure.

FIG. 7 illustrates a block diagram of an example device 700 in accordance with some example implementations of the present disclosure. The device 700 may be implemented as or included in an AP 110 in FIG. 1 or any other type of device which is capable of receiving the broadcasted intrusion detection information in a network.

The device 700 comprises at least one processor 710 and a memory 720 coupled to the at least one processor 710. The memory 720 stores instructions to cause the at least one processor 710 to implement acts of a method according to some example implementations as described herein.

As illustrated in FIG. 7, the memory 720 stores instructions 722 to receive intrusion detection information related to at least one device that is detected to be illegal in a wireless communication network, the intrusion detection information comprising at least one identifier of the at least one device. In some example implementations, the at least one identifier of the at least one device comprises at least one BSSID of the at least one device.

The memory 720 further stores instructions 724 to determine whether the intrusion detection information comprises a first identifier of the first device.

The memory 720 further stores instructions 726 to transmit a notification indicating that the first device is a legal device in accordance with a determination that the intrusion detection information comprises the first identifier of the first device and that the first device is a legal device.

In some example implementations, the acts further comprises: in accordance with a determination that the intrusion detection information comprises the first identifier of the first device and containment information indicating at least a second identifier of a second device, determining that the second device disconnects a connection between the first device and a client; and transmitting a request to the second device to allow the connection between the first device and the client.

In some example implementations, the memory 720 further stores instructions 728 to broadcast the intrusion detection information in accordance with a determination that the intrusion detection information does not comprise the first identifier of the first device.

In some example implementations, the instructions to broadcast the intrusion detection information comprise instruction to disconnect a connection between the at least one device and a client with which the at least one device is connected, instructions to update the intrusion detection information by including containment information associated with the first device into the intrusion detection information and instructions to broadcast the updated intrusion detection information.

In some example implementations, wherein the containment information further indicates an approach used by the first device to disconnect the connection between the at least one device and the client.

In some example implementations, the instructions to broadcast the intrusion detection information comprise instructions to encrypt the updated intrusion detection information; and instructions to broadcast the encrypted and updated intrusion detection information.

In some example implementations, the instructions to broadcast the intrusion detection information comprise instructions to insert the intrusion detection information in a vendor information element of a beacon frame for the communication device and to broadcast the beacon frame.

The memory 720 further stores instructions to a request from a third device of the at least one device to allow the connection between the third device and the client, the request comprising the first identifier of the first device, and instructions to allow the connection between the third device and the client in response to receipt of the request.

The present disclosure also provides at least one computer program product tangibly stored on a non-transitory computer-readable storage medium. The computer program product includes program codes or instructions which can be executed to carry out the method as described above with reference to FIG. 2 and FIG. 4.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   detecting, by an access point (AP), an illegal device in a wireless communication network;
   obtaining, by the AP, intrusion detection information related to the illegal device, the intrusion detection information comprising a first identifier of the illegal device,
   wherein the first identifier of the illegal device is a Basic Service Set Identifier (BSSID) of the illegal device;
   encrypting, by the AP, the intrusion detection information with the first identifier of the illegal device related to the illegal device, a second identifier of the AP that detected the illegal device, and a third identifier of a client with which the illegal device is connected,
   wherein the second identifier of the AP that detected the illegal device is the BSSID and the third identifier of the client with which the illegal device is connected is the BSSID; and
   broadcasting the encrypted intrusion detection information with the first identifier, the second identifier, and the third identifier, wherein broadcasting the encrypted intrusion detection information comprises:
      inserting the encrypted intrusion detection information in a vendor information element of a beacon frame for the AP; and
      broadcasting the beacon frame,
   wherein devices that conform to a same secret agreement are enabled to decrypt the encrypted intrusion detection information from the AP and between each other, and
   wherein the devices are enabled to disconnect connections to the Basic Service Set Identifier (BSSID) of the illegal device.

2. The method of claim 1, wherein the intrusion detection information indicates an approach used by the AP to disconnect the connection between the illegal device and the client.

3. The method of claim 1, further comprising:
   receiving, by the AP, a request from a first device of the illegal device to allow the connection between the first device and the client, the request comprising an identifier of the AP; and
   in response to receipt of the request, allowing the connection between the first device and the client.

4. The method of claim 1, further comprising:
   performing containment of the illegal device by disconnecting, by the AP, a connection between the illegal device and the client with which the illegal device is connected.

5. The method of claim 1, further comprising:
   broadcasting, by the AP, a second BSSID of the AP with the broadcasting of the first identifier corresponding with the BSSID of the illegal device, wherein broadcasting the first identifier corresponding with the BSSID and the second BSSID enables devices in the wireless communication network to determine that the AP is performing containment on the illegal device and that the AP has already been protected.

6. The method of claim 1, wherein the illegal device is detected upon the illegal device initiating a deauthentication attack so that authentications between the AP and the client corresponding with the third identifier becomes invalid.

7. The method of claim 1, wherein the encrypted intrusion detection information inserted into the beacon frame for the AP identifies an attack performed by the illegal device as an AP Flood Attack.

8. The method of claim 1, wherein the encrypted intrusion detection information inserted into the beacon frame for the AP identifies an attack performed by the illegal device as a Disconnect Station Attack.

9. The method of claim 1, wherein the encrypted intrusion detection information inserted into the beacon frame for the AP identifies an attack performed by the illegal device as a Man in the Middle Attack.

10. The method of claim 1, wherein the encrypted intrusion detection information inserted into the beacon frame for the AP identifies an attack performed by the illegal device as an AP Deauth Containment.

11. The method of claim 1, wherein the encrypted intrusion detection information inserted into the beacon frame for the AP identifies an attack performed by the illegal device as a Tarpit Containment.

12. A method comprising:
receiving, by a first device and from an access point (AP), encrypted intrusion detection information related to an illegal device that is detected to be illegal in a wireless communication network, the encrypted intrusion detection information comprising a first identifier of the first device that sent the encrypted detection information, a second identifier of the illegal device, and a third identifier of a client with which the illegal device is connected,
wherein the second identifier of the illegal device is a Basic Service Set Identifier (BSSID) of the illegal device;
decryption, by the first device, the encrypted intrusion detection information, wherein the first device confirms to a same secret agreement as the AP;
determining that the encrypted intrusion detection information comprises the first identifier of the AP that detected the illegal device, the second identifier of the illegal device, and the third identifier of the client with which the illegal device is connected;
in accordance with a determination that the encrypted intrusion detection information comprises the second identifier of the illegal device, determining that the illegal device disconnects a connection between the first device and the client;
in accordance with a determination that the encrypted intrusion detection information comprises the first identifier of the first device and that the first device is a legal device, transmitting, by the first device and the AP, a notification idnciating that the firt device is a legal device;
inserting information associated with the illegal device that is detected to be illegal in a vendor information element of a beacon frame; and
broadcasting the beacon frame, wherein the first device and the AP are enabled to disconnect connections to the Basic Service Set Identifier (BSSID) of the illegal device based on the information associated with the illegal device of the beacon frame.

13. The method of claim 12, further comprising:
transmitting, by the first device, a request to the second device to allow the connection between the first device and the client.

14. The method of claim 12, further comprising:
in accordance with a determination that the encrypted intrusion detection information does not comprise the first identifier of the first device, broadcasting, by the first device, the encrypted intrusion detection information.

15. The method of claim 14, wherein broadcasting the encrypted intrusion detection information comprises:
disconnecting, by the first device, a connection between the illegal device and the client with which the illegal one device is connected;
updating the encrypted intrusion detection information by including containment information associated with the first device into the intrusion detection information, the containment information indicating at least the first identifier of the first device; and
broadcasting, by the first device, the updated encrypted intrusion detection information.

16. The method of claim 15, wherein the containment information further indicates an approach used by the first device to disconnect the connection between the illegal device and the client.

17. The method of claim 15, further comprising:
receiving, by the first device, a request from a third device of the illegal device to allow the connection between the third device and the client, the request comprising the first identifier of the first device; and
in response to receipt of the request, allowing the connection between the third device and the client.

18. A communication device comprising:
at least one processor; and
a memory coupled to the at least one processor, the memory storing instructions to cause the at least one processor to perform acts comprising:
detecting at least one device in a wireless communication network to be an illegal device;
obtaining intrusion detection information related to the illegal device, the intrusion detection information comprising a first identifier of the illegal device,
wherein the first identifier of the illegal device is a Basic Service Set Identifier (BSSID) of the illegal device;
disconnecting a connection between the illegal device and a client with which the illegal device is connected; and
encrypting the intrusion detection information with the first identifier of the illegal device, a second identifier of the AP that detected the illegal device, and a third identifier of a client with which the illegal device is connected,
wherein the second identifier of the AP that detected the illegal device is the BSSID and the third identifier of the client with which the illegal device is connected is the BSSID; and
broadcasting the encrypted intrusion detection information with the first identifier, the second identifier, and the third identifier, wherein braodcasting the encrypted intrusion detection information comprises:
inserting the encrypted intrusion detection information in a vendor information element of a beacon frame; and
broadcasting the beacon frame,
wherein devices that conform to a same secret agreement are enabled to decrypt the encrypted intrusion detection information from the AP and between each other, and
wherein the devices are enabled to disconnect connections to the Basic Service Set Identifier (BSSID) of the illegal device.

19. The communication device of claim 18, wherein the intrusion detection information indicates an approach used by the communication device to disconnect the connection between the illegal device and the client.

20. The communication device of claim 18, wherein the acts further comprises:
- receiving a request from a first device of the illegal device to allow the connection between the first device and the client, the request comprising an identifier of the communication device; and
- in response to receipt of the request, allowing the connection between the first device and the client.

\* \* \* \* \*